United States Patent [19]

Lansbergen et al.

[11] Patent Number: 4,479,976

[45] Date of Patent: Oct. 30, 1984

[54] HARDENED BUTTERFAT IN MARGARINE FAT BLENDS

[75] Inventors: Gabriël J. T. Lansbergen, 's-Gravezande; Josephus M. A. Kemps, Udenhout, both of Netherlands

[73] Assignee: Lever Brothers Company, New York, N.Y.

[21] Appl. No.: 413,904

[22] Filed: Sep. 1, 1982

[30] Foreign Application Priority Data

Sep. 9, 1981 [GB] United Kingdom ............... 8127262

[51] Int. Cl.³ .............................................. A23D 5/00
[52] U.S. Cl. ................................... 426/607; 426/313; 426/586
[58] Field of Search ............... 426/607, 608, 313, 417, 426/429, 489

[56] References Cited

U.S. PATENT DOCUMENTS

| | | | |
|---|---|---|---|
| 2,272,578 | 2/1942 | Penn | 426/313 |
| 2,404,034 | 7/1946 | Buxton | 426/429 X |
| 2,955,039 | 10/1960 | Melnick | 426/607 X |
| 3,519,435 | 7/1970 | MacCollom | 426/417 X |
| 3,878,231 | 4/1975 | Harwood | 426/607 X |
| 4,005,228 | 1/1977 | Norris | 426/429 X |
| 4,201,718 | 5/1980 | Marsch . | |

FOREIGN PATENT DOCUMENTS 2832636 3/1980 Fed. Rep. of Germany .
2415138 8/1979 France .

Primary Examiner—Robert Yoncoskie
Attorney, Agent, or Firm—James J. Farrell

[57] ABSTRACT

A process for the fractionation of hardened butterfat resulting in a fraction (i) enriched in triglycerides comprising two fatty acid residues having each at least 16 carbon atoms and 1 fatty acid residue with 2 to 8 carbon atoms, said triglycerides having a carbonnumber ranging from 24 to 42 and a fraction (ii) enriched in triglycerides having a carbonnumber greater than 42. Fractionation is preferable carried out in the presence of a solvent such as acetone or hexane. Margarine fat blends containing fraction (i) display improved butterlike properties.

1 Claim, No Drawings

HARDENED BUTTERFAT IN MARGARINE FAT BLENDS

The present invention relates to a process involving wet fractionation of hardened butterfat.

By wet fractionation is meant a fractionation carried out in the presence of a solvent. By hardened butterfat is meant butterfat which has been hydrogenated whereby substantially all the unsaturated fatty acid residues in the triglycerides of the fat are converted in saturated fatty acid residues.

The present invention also relates to margarine fat blends containing one or more fractions resulting from said fractionation, which display improved butterlike properties, by which term is meant a plasticity and an elasticity comparable to those of natural, churned butter. References relating to these properties and their measurements are for example:

J. Dairy Res. 8, 245 (1937), Davies J. C., and The British Food Manuf. Ind. Res. Inst., the Rheology of Margarine and Compound Cooking Fats, Part I (Res. Rep. 37) and Part II (Res. Rep. 69), 1956, Prentice J. H.

There is need of margarines and spreads displaying butterlike properties, but which are considerably cheaper than natural butter.

Applicants have found that triglycerides having a carbonnumber ranging from 24–42 and comprising 2 fatty acid residues with a chainlength of 16 or more carbon atoms and 1 fatty acid residue having each a chainlength of 2–8 carbon atoms, where able to impart butterlike properties to conventional margarine fat blends, when incorporated in said fat blends at a level as low as 10% by weight.

The carbonnumber is defined as being the sum of the carbon atoms of the fatty acid residues in a triglyceride molecule. The above defined triglycerides having a carbonnumber ranging from 24 to 42 are abundantly present in butterfat, but these are difficult to separate from the other triglycerides which have a carbonnumber greater than 42, when conventional fractionation techniques are applied.

The invention is based on the discovery that a good fractionation could be achieved provided the butterfat is hardened i.e. hydrogenated until substantially all unsaturated bonds of the fatty acid residues in the triglycerides are converted in saturated bonds.

Applicants have found that fractionation of hardened butter in the presence of a solvent could be carried out very efficiently to yield a fraction containing 65–100% of triglycerides having a carbonnumber ranging from 24–42 and comprising 2 fatty acid residues having each a chainlength of 16 or more carbon atoms (perferably 16 or 18 carbon atoms) and 1 fatty acid residue with a chainlength of 2–8 carbon atoms.

The process according to the invention therefore comprises:

(a) hydrogenating butterfat to convert substantially all unsaturated bonds in saturated bonds (b) fractionating the hydrogenated butterfat to obtain a fraction (i) enriched in triglycerides comprising 2 fatty acid residues with a chainlength of 16 or more carbon atoms and 1 fatty acid residue with a chainlength of 2 to 8 carbon atoms, said triglycerides having a carbonnumber ranging from 24 to 42 and a fraction (ii) enriched in triglycerides having a carbonnumber greater than 42.

Put in other words the triglycerides as hereinbefore defined with a carbonnumber ranging from 24–42 can be obtained in fraction (i) consisting for 65–100% of said triglycerides.

The butterfat is hydrogenated until substantially all the unsaturated fatty acid residues are converted in saturated fatty acid residues. The degree of saturation can be checked measuring the refractive index or the iodine value of the fat.

Preferably the butterfat is hydrogenated to obtain a iodine value ranging from 0–10 and ideally lower than 5. Hydrogenation is carried out in a way known per sé, using techniques as described in Bailey's Industrial Oil and Fat Products (Interscience Publ. 1945 or in Margarine by Andersen and Williams, Pergamon Press second revised edition 1965, p. 47–48), e.g. using a nickel catalyst at 100° C. and atmospheric pressure.

The fractionation step can be carried out, using organic solvents such as ketones, e.g. acetone, hydrocarbons, e.g. hexane, or alcohols, e.g. methanol, ethanol, isopropyl alcohol. The ratio of solvent substrate can range 1:1 to 10:1.

Fractionation can also be carried out in an aqueous solution containing surface active agents e.g. a so-called Lanza solution containing 0.1–0.2 wt % laurylsulfate and about 2% magnesiumsulfate at a temperature ranging from 35°–45° C.

The preferred solvents are acetone, which is preferably used in a ratio of 5:1, and hexane, which is preferably used in a ratio of 2:1.

Fractionation can be carried out either in one step by cooling a mixture of hardened butterfat and solvent at a temperature preferably ranging from 8°–20° C. (in the case where acetone is used) and separating the stearin (higher melting fraction enriched in triglycerides with a carbonnumber higher than 42) from the olein (lower melting fraction enriched in triglycerides as hereinbefore defined with a carbonnumber ranging from 24–42), which still remains in solution, or in two steps, in which a mixture of the olein and the solvent is further cooled down to a temperature preferably ranging from 10° to −5° C., whereby a second stearin and a second olein are separated (both fractions are enriched in triglycerides as hereinbefore defined with a carbonnumber ranging from 24–42).

In the case where hexane is used as a solvent, the fractionation can be carried out either in one step at a temperature preferably ranging from 5° to 20° C., or in two steps, in which the olein, which remained in solution after the first fractionation is cooled down to a temperature preferably ranging from 0° to 15° C., whereby a second stearin and a second olein are separated.

For other solvents appropriate fractionation conditions can easily be found.

Applications have found that the first olein, the second stearin (mid-fraction) and the second olein (bottom fraction) impart butterlike properties to fat blends when used for producing margarines and emulsion spreads. The proportion of these fractions to be used in fat blends for producing margarines and spreads may vary from 10 to 100%, preferably between 15–50%, subject to the properties of the other fat components of the blend and their solid fat content at temperatures ranging from 5° to 20° C., which should allow a sufficient spreadability within this temperature range.

The invention will now be illustrated by the following Examples.

EXAMPLE 1

Acetone fractionation of hardened butterfat

The fractionation was carried out in a 60 l crystallization vessel comprising and a cylindrical rotor (diameters 0.3 m and 0.15 m, respectively, and a height of 1.1 m). A rotor speed of 2 rev/s was used. A solution of hardened butterfat (obtained by hydrogenation of natural butter with a nickel catalyst at 100° C. under atmospheric pressure to an iodine value of 0.86 and a melting point of 45° C.) in acetone was prepared. The crystallizer was filled and the solution was heated to about 40° C. in order to obtain a clear solution. Then the coolant through the jacket of the crystallization vessel was directly lowered in temperature to 11° C. After about ¾-1 hour the solution was cooled to about 12° C. and stabilized for 2 hours. The contents were filtered with a Seitz filter and filter cake was washed with acetone of 8° C. After removing the acetone, about 50% of stearin (hard fraction) and 50% of olein (soft fraction) were obtained. The soft fraction was separated into 2 parts. A clear solution of this olein in acetone (1:5) was then cooled in the crystallizer either to 0° C. or to 6° C. After crystallizing for 2 hours, the slurry was then filtered again and washed. At 6° C. the olein was split into two fraction, of which the stearin is the mid-fraction of the hardened butter and the olein is the bottom fraction. At 0° C. the amount of mid-fraction was somewhat higher. Analytical results of the fractionation are given in Tables 1 and 2.

COMPARATIVE EXAMPLE 1

Acetone fractionation of butterfat

All experiments were carried out in a solution of butterfat in acetone, of which the ratio of acetone:butterfat (or butterfat fractions) was fixed at 5 (by weight). The fractionations were carried out in a 600 l crystallization vessel consisting of a cylindrical vessel and a cylindrical rotor (diameters 0.6 and 0.3 m, respectively, and a height of about 3 m), with a rotor speed of 1.5 rev/sec. The solution of butterfat (or butterfat fraction) in acetone was made externally and the crystallization vessel was filled. If necessary, the solution was heated to e.g. 35° C. to obtain a clear solution (without crystal nuclei).

In order to obtain a butter mid-fraction, the crystallizer was filled with butterfat/acetone. In the earlier stage of the experiment the temperature of the coolant flowing through a jacket of the crystallizer vessel was lowered directly to −4.5° C., this being the final coolant temperature, which is about 1° C. lower than the final temperature of the butterfat/acetone solution. Within 1–1.5 h the contents were cooled to this desired temperature and stabilized for 2 hours to form enough solids.

The contents were then filtered in a Seitz filter (diameter 0.5 m), which was pre-conditioned at the crystallization temperature; a poly-ester filter cloth with a mean pore size of 80 um was used. Batches of 100–150 l were filtered and the filter cake was washed 3 times with fresh acetone of about −8° C. The wash acetone was added to the first filtrate. Thereafter the acetone was distilled off and the yields of both fractions were determined.

1 Part by weight of the stearin obtained (=hard fraction) was dissolved again in 5 parts of acetone. The crystallizer was filled with this solution. The solution was heated until it was clear. This solution was then cooled to 22° C. by using a coolant temperature of 21° C. Again a stabilization time of 2 hours was taken and the filtration was carried out in the Seitz filter. The filter cake was washed with fresh acetone of about 18° C. After distillation of the acetone 2 fractions were obtained:

stearin=top fraction of butterfat.
olein (filtrate)=mid-fraction of butterfat.

The analytic results of the fraction are given in Tables 3 and 4.

In this Comparative Example it is shown that starting from non-hydrogenated natural butter, the fractionation did not lead to a fraction having a sufficiently high proportion of triglycerides with a carbonnumber ranging from 24–42.

TABLE 1

ACETONE FRACTIONATION OF HARDENED BUTTERFAT

| Triglyceride carbon number | Hardened BU | first stearin "top" | first olein | Fract. at 12 and 0°C. | | | | Fract. at 12 and 6°C. | | | |
|---|---|---|---|---|---|---|---|---|---|---|---|
| | | | | first stearin "top" | first olein | second stearin "mid" | second olein "bottom" | first stearin "top" | first olein | second stearin "mid" | second olein "bottom" |
| 24 | 0.4 | — | 0.6 | — | 0.8 | — | 2.4 | — | 0.8 | 0.1 | 1.4 |
| 26 | 0.2 | — | 0.4 | — | 0.3 | — | 1.2 | — | 0.4 | — | 0.8 |
| 28 | 0.6 | — | 1.1 | — | 1.0 | — | 3.1 | 0.1 | 1.1 | 0.3 | 2.0 |
| 30 | 1.2 | — | 2.3 | — | 2.0 | — | 5.6 | 0.1 | 2.1 | 0.4 | 3.8 |
| 32 | 3.1 | 0.3 | 5.4 | 0.1 | 4.6 | 0.5 | 11.6 | 0.3 | 5.1 | 1.0 | 8.1 |
| 34 | 7.2 | 0.7 | 12.3 | 0.5 | 10.4 | 4.3 | 20.5 | 1.0 | 10.8 | 3.6 | 16.7 |
| 36 | 13.0 | 2.0 | 20.1 | 1.5 | 18.5 | 16.6 | 21.6 | 3.0 | 19.2 | 12.4 | 23.5 |
| 38 | 12.7 | 3.5 | 20.3 | 4.1 | 20.9 | 25.0 | 13.8 | 5.7 | 20.9 | 22.7 | 17.2 |
| 40 | 9.6 | 4.0 | 14.4 | 6.3 | 14.7 | 18.2 | 8.7 | 7.5 | 14.3 | 17.2 | 10.6 |
| 42 | 7.5 | 5.0 | 9.6 | 4.0 | 9.2 | 11.4 | 5.4 | 4.5 | 9.4 | 10.9 | 7.3 |
| | Σ55.5 | 15.5 | 86.5 | 16.5 | 82.4 | 76.0 | 93.9 | 22.2 | 84.1 | 68.6 | 91.4 |
| 44 | 7.3 | 8.7 | 6.1 | 5.2 | 6.4 | 8.6 | 2.6 | 5.4 | 6.6 | 8.9 | 4.2 |
| 46 | 7.9 | 13.1 | 3.5 | 8.9 | 4.4 | 6.3 | 0.7 | 8.9 | 4.1 | 6.9 | 2.1 |
| 48 | 9.0 | 17.6 | 2.0 | 14.2 | 2.8 | 3.9 | 0.8 | 14.0 | 2.1 | 4.6 | 0.5 |
| 50 | 10.1 | 21.0 | 1.1 | 20.7 | 2.1 | 2.8 | 0.7 | 19.4 | 1.1 | 4.6 | 0.8 |
| 52 | 7.9 | 16.7 | 0.4 | 21.1 | 1.1 | 1.4 | 0.5 | 18.7 | 1.3 | 4.1 | 0.4 |
| 54 | 3.0 | 6.4 | 0.2 | 12.4 | 0.7 | 0.7 | 0.4 | 10.7 | 0.6 | 2.2 | 0.2 |
| 56 | 0.3 | 0.6 | — | 0.8 | 0.1 | — | 0.1 | 0.7 | — | — | — |

*Odd acid triglycerides with uneven number (2n + 1) are included with triglycerides with even carbon number 2n.

TABLE 2

Fatty Acids Composition (in wt. %) of Hardened Butterfat and Fractions obtained by Acetone Fractionation

| Main fatty acids | Hardened butter | first stearin "top" | first olein | second stearin mid | second olein bottom | first stearin "top" | first olein | second stearin mid | second olein bottom |
|---|---|---|---|---|---|---|---|---|---|
| $C_{4:0}$ | 3.3 | 0.7 | 6.0 | 5.3 | 6.9 | 1.2 | 5.8 | 4.9 | 6.3 |
| $C_{6:0}$ | 2.2 | 0.7 | 3.6 | 3.1 | 4.5 | 0.9 | 3.6 | 3.0 | 4.0 |
| $C_{8:0}$ | 1.4 | 0.4 | 2.2 | 1.6 | 3.5 | 0.6 | 2.3 | 1.7 | 2.9 |
| $C_{10:0} + C_{10:1}$ | 3.2 | 1.3 | 4.6 | 3.5 | 7.2 | 1.7 | 4.8 | 3.8 | 6.0 |
| $\Sigma$ | 10.1 | 3.1 | 16.4 | 13.5 | 22.1 | 4.4 | 16.5 | 13.4 | 19.2 |
| $C_{12:0}$ | 3.7 | 2.0 | 5.1 | 2.8 | 9.3 | 2.2 | 5.4 | 3.5 | 7.4 |
| $C_{13:0}$ | 0.1 | — | 0.1 | — | 0.2 | — | 0.1 | — | 0.2 |
| $C_{14:0}$ | 11.3 | 8.7 | 13.0 | 10.6 | 18.1 | 8.8 | 13.9 | 9.8 | 17.6 |
| $C_{15br}*$ | 0.9 | 0.6 | 1.2 | 0.6 | 1.8 | 0.5 | 1.1 | 0.6 | 1.5 |
| $C_{15:0}$ | 1.2 | 1.3 | 1.5 | 1.3 | 1.3 | 1.0 | 1.3 | 1.2 | 1.5 |
| $C_{16:0} (+ C_{16:1})$ | 26.4 | 24.7 | 27.3 | 31.1 | 23.3 | 24.6 | 28.4 | 30.9 | 25.8 |
| $C_{17\,br}*$ | 0.8 | 1.0 | 1.1 | 0.8 | 1.1 | 0.7 | 0.9 | 0.8 | 1.0 |
| $C_{17:0}$ | 1.1 | 1.3 | 1.2 | 1.1 | 0.9 | 1.2 | 1.0 | 1.1 | 1.0 |
| $C_{18:0}$ | 43.2 | 54.7 | 31.0 | 36.9 | 20.9 | 54.7 | 30.3 | 37.2 | 23.9 |
| $C_{18:1}$ |  |  |  |  |  |  | 0.1 | 0.1 | 0.1 |
| $C_{18:2}$ |  |  | 0.1 |  |  |  |  |  |  |
| $C_{18:3}$ |  |  | 0.1 |  |  |  |  |  |  |
| $C_{20:0}$ | 1.1 | 1.8 | 1.0 | 0.8 | 0.3 | 1.1 | 0.5 | 0.8 | 0.5 |
| $C_{20:1}$ | 0.1 | 0.3 | 0.2 | — | 0.2 |  |  |  |  |

*br = branched

TABLE 3

Carbon Number of Natural Butterfat and Fractions Obtained by Acetone Fractionation

| Triglycerine carbon number* | Natural Butterfat | Stearin top fraction | Olein Mid-fraction | Olein bottom fract. |
|---|---|---|---|---|
| 24 | tr | — | tr | 0.1 |
| 26 | 0.2 | — | tr | 0.4 |
| 28 | 0.2 | — | 0.1 | 1.0 |
| 30 | 1.2 | — | 0.2 | 2.2 |
| 32 | 3.1 | 0.1 | 0.7 | 4.9 |
| 34 | 7.2 | 0.5 | 4.3 | 9.5 |
| 36 | 12.0 | 1.1 | 12.7 | 12.6 |
| 38 | 12.8 | 1.0 | 12.1 | 14.4 |
| 40 | 9.8 | 1.5 | 9.0 | 11.1 |
| 42 | 7.6 | 4.7 | 9.2 | 6.8 |
| $\Sigma$ | 54.5 | 8.9 | 48.3 | 61.0 |
| 44 | 7.4 | 11.3 | 8.9 | 6.0 |
| 46 | 8.1 | 19.8 | 8.7 | 6.1 |
| 48 | 9.0 | 22.9 | 10.8 | 6.3 |
| 50 | 9.7 | 22.0 | 12.8 | 6.4 |
| 52 | 7.5 | 11.4 | 7.7 | 7.1 |
| 54 | 3.0 | 2.6 | 2.1 | 4.0 |
| 56 | 0.2 | 0.7 | 0.3 | 0.4 |
| 58 |  | 0.2 |  |  |

* = Odd acid triglycerides of carbon number 2n + 1 are included with triglycerides of carbon number 2n.

TABLE 4

Fatty Acids Composition of Natural Butterfat and Fractions Obtained by Acetone Fractionation

| Main fatty acids | Original butter | Top fraction | Mid-fraction | Olein fraction |
|---|---|---|---|---|
| $C_{4:0}$ | 3.8 | 0.1 | 2.9 | 4.6 |
| $C_{6:0}$ | 2.5 | — | 2.0 | 2.9 |
| $C_{8:0}$ | 1.5 | 0.2 | 1.1 | 1.9 |
| $C_{10:0} + C_{10:1}$ | 3.7 | 0.9 | 2.8 | 4.5 |
| $\Sigma$ | 11.5 | 1.2 | 8.8 | 13.9 |
| $C_{12:0}$ | 5.2 | 3.3 | 3.9 | 5.9 |
| $C_{14:0}$ | 12.5 | 14.1 | 12.9 | 12.3 |
| $C_{14:1} + C_{15:0\,br}*$ | 2.1 | 0.7 | 1.4 | 2.6 |
| $C_{15:0}$ | 1.2 | 1.6 | 1.3 | 1.0 |
| $C_{16:0}$ | 30.9 | 49.2 | 42.0 | 21.7 |
| $C_{16:1} + C_{17:0\,br}*$ | 2.4 | 0.7 | 1.6 | 3.0 |
| $C_{17:0}$ | 0.7 | 1.0 | 0.8 | 0.6 |
| $C_{18:0}$ | 8.9 | 20.5 | 12.6 | 5.4 |
| $C_{18:1}$ | 20.2 | 5.4 | 12.3 | 27.8 |
| $C_{18:2}$ | 2.1 | 0.8 | 1.4 | 2.9 |
| $C_{18:3}$ | 0.7 | 0.3 | 0.2 | 0.9 |
| $C_{20:0}$ | 0.7 | 0.6 | 0.5 | 0.8 |
| $C_{20:1}$ | 0.2 | — | — | 0.4 |

* = branched

In the following Examples margarines were prepared and subsequently evaluated under conditions in which their hardness (yield value) is approximately 1000 g/cm² or higher, using a penetrometer (cone angle 40° C.)

EXAMPLE 2

A margarine was prepared in a Votator apparatus from (1) a fat phase (83.64%) consisting of the olein fraction obtained by fractionation of hardened butterfat in acetone at 12° C. (see Ex. 1) and colouring substance (0.2%) and (2) an aqueous phase at pH 4.2, consisting of water (16%), potassium sorbate (0.1%) and lactic acid (0.06%).

The margarine was evaluated by a panel of experts on plasticity and elasticity and compared with a butter prepared by processing butterfat through a Votator. The scores as to plasticity and elasticity were comparable to those of Votator-processed butter.

COMPARATIVE EXAMPLE 2

A margarine was prepared in a Votator apparatus, starting from (1) a fat phase (83.64%) consisting of 14.64% of the stearin fraction obtained by fractionation of hardened butter in acetone at 12° C. (see Example 1), 69% sunflower oil and 0.2% of colouring substance, and (2) an aqueous phase (pH 4.2) consisting of water (16%), potassium sorbate (0.1%) and lactic acid (0.06%).

This margarine was evaluated by a panel of experts as to plasticity and elasticity and the scores were compared to the scores given to a Votator-processed butter. This margarine was found to have insufficient butterlike properties.

EXAMPLE 3

A margarine was prepared in a Votator apparatus, starting from
(1) a fat phase (83.64%) consisting of the second olein obtained by fractionation of hardened butterfat in acetone at 0° C. and 6° C. (see Example 1) and a colouring substance (0.2%), and
(2) an aqueous phase of pH 4.2 consisting of water (16%), potassium sorbate (0.1%) and lactic acid (0.06%).

The margarine was evaluated by a panel of experts as to plasticity and elasticity and compared with a butter prepared by processing butterfat through a Votator. The scores on plasticity and elasticity of the margarine were comparable to those of Votator-processed butter.

The margarines processed according to Example 2 and Comparative Examples 2 and 3 were subjected to a temperature cycling within a temperature range varying from 5° to 25° C. Margarines from Examples 2 and 3 retained their butterlike properties.

Even after the temperature cycling, the margarines of Comparative Example 2 was found to have insufficient butterlike properties.

We claim:
1. Margarine fat blends, in which 10 to 100% by weight of the fat blends consist of substantially saturated triglycerides obtained from hardened butterfat having a carbon number preselected for margarine fat blends ranging from 24–42, which comprise 2 fatty acid residues having each 16 carbon atoms or more and 1 fatty acid residue having 2 to 8 carbon atoms.

* * * * *